US012566095B2

(12) United States Patent
Delgadillo

(10) Patent No.: US 12,566,095 B2
(45) Date of Patent: Mar. 3, 2026

(54) SAUTE STATIONS WITH COLD PACK THERMAL STORAGE AND INSULATED TEMPERATURE SENSORS

(71) Applicant: Hector Delgadillo, Duarte, CA (US)

(72) Inventor: Hector Delgadillo, Duarte, CA (US)

(73) Assignees: West Star Industries, Stockton, CA (US); Hector Delgadillo, Irwindale, CA (US)

( * ) Notice: Subject to any disclaimer, the term of this patent is extended or adjusted under 35 U.S.C. 154(b) by 189 days.

(21) Appl. No.: 18/387,718

(22) Filed: Nov. 7, 2023

(65) Prior Publication Data

US 2024/0125654 A1    Apr. 18, 2024

(51) Int. Cl.
G01K 1/16 (2006.01)
F25D 3/00 (2006.01)
F25D 3/04 (2006.01)
F25D 29/00 (2006.01)

(52) U.S. Cl.
CPC ............... G01K 1/16 (2013.01); F25D 3/005 (2013.01); F25D 3/045 (2013.01); F25D 29/005 (2013.01); F25D 2201/126 (2013.01); F25D 2700/12 (2013.01)

(58) Field of Classification Search
CPC . F25D 3/00; F25D 3/005; F25D 3/045; F25D 29/00; F25D 29/005; F25D 2201/126; F25D 2700/12
See application file for complete search history.

(56) References Cited

U.S. PATENT DOCUMENTS

| | | | |
|---|---|---|---|
| 5,248,121 A | 9/1993 | Harrington | |
| 5,704,485 A | 1/1998 | Cauterrels et al. | |
| 6,029,457 A * | 2/2000 | Neeser | A47J 36/2494 |
| | | | 62/46.1 |
| 6,843,062 B2 * | 1/2005 | Crete | F25D 3/08 |
| | | | 62/457.2 |
| 7,448,224 B2 | 11/2008 | Wu et al. | |
| 9,068,773 B2 | 6/2015 | Lintker et al. | |
| 9,523,532 B2 | 12/2016 | Delgadillo | |

(Continued)

FOREIGN PATENT DOCUMENTS

| | | | | |
|---|---|---|---|---|
| CA | 2696059 A1 * | 9/2011 | ............. | G01K 13/00 |
| EP | 2352976 B1 * | 6/2014 | ............... | A23B 2/80 |
| WO | WO-2022258945 A1 * | 12/2022 | ............ | F25B 39/024 |

*Primary Examiner* — Jonathan Bradford

(74) *Attorney, Agent, or Firm* — Steven A. Nielsen; www.NielsenPatents.com

(57) ABSTRACT

Dual temperature saute stations include thermal systems to facilitate mobile food preparation using means of refrigeration/heat transfer to and from cold pack thermal systems in thermal communication with refrigeration coils. A sauté station may include an outer foam pack shell enclosing a cold pack layer with thermal tubing disposed within the cold pack layer. The cold pack layer acts as a thermal storage station, sometimes used to cool the thermal tubing and the thermal tubing sometimes used to cool the cold pack layer. The food preparation stations demonstrate further thermal efficiency by use of a buffered or enclosed temperature sensor, with the temperature sensor encased within a thermal layer or shell so as to not immediately react to incoming ambient air when a refrigerator door is opened. Thus, the sensor mimics the temperature of the food avoiding unnecessary cycling of the condenser.

10 Claims, 8 Drawing Sheets

(56)  References Cited

U.S. PATENT DOCUMENTS

| | | | |
|---|---|---|---|
| 9,671,155 B2 | 6/2017 | Delgadillo | |
| 2014/0230468 A1 | 8/2014 | Delgadillo | |
| 2016/0209112 A1* | 7/2016 | Bayless | F25D 7/00 |
| 2017/0307446 A1* | 10/2017 | Hegedus | F25D 29/008 |
| 2018/0202685 A1 | 7/2018 | Pignolo | |

* cited by examiner

100

100

200

8

206

204

206

8

227

206

260

280

320

300

SAUTE STATIONS WITH COLD PACK THERMAL STORAGE AND INSULATED TEMPERATURE SENSORS

COPYRIGHT AND TRADEMARK NOTICE

This application includes material which is subject or may be subject to copyright and/or trademark protection. The copyright and trademark owner(s) has no objection to the facsimile reproduction by any of the patent disclosure, as it appears in the Patent and Trademark Office files or records, but otherwise reserves all copyright and trademark rights whatsoever.

BACKGROUND OF THE INVENTION

(1) Field of the Invention

The invention generally relates to refrigeration systems. More particularly, the invention relates to the manufacture and application of heat transfer and temperature control within sauté station using gel packs and insulated or buffered thermometers to avoid unnecessary condenser runs.

(2) Description of the Related Art

With respect to the pan chiller aspects of the disclosed embodiments:

U.S. Pat. No. 9,671,155 Cylinder Pan Chiller by Delgadillo issued on Jun. 6, 2017 uses an interesting combination of voids, foam insulation and refrigerant contained or flowing within cylindrical chambers and eschews the movement of air over food products. Unfortunately, the system is limited to a cylindrical format and a constrained fastening system using various rings or lips. The system is not well suited for a traditional pan chiller wherein a plurality of food trays are disposed within a horizontal food chilling system, as each food tray cannot ne efficiently encircled by chilled walls.

U.S. Pat. No. 9,353,986 Glycol Pan Chiller Systems by Delgadillo issued on May 31, 2016 does attempt to use a pool of glycol to transfer heat away from refrigerant lines, with the refrigerant lines circling and in contact with the perimeter and outside surface of an inner pan assembly. Unfortunately, the system lacks any reliable temperature probe pool and requires a plurality of separate cooling systems to remove thermal energy from the various coolant lines and tanks. Moreover, there can be difficulty in filling and refilling glycol tanks.

U.S. Pat. No. 9,523,532 Glycol Pan Chiller Systems with Integrated Stove Top by Delgadillo issued on Dec. 20, 2016 does use glycol to bathe cooling lines filled with freon, but requires a first and second cooling area, with the second cooling area burdened with a heat exchange system or condenser. Thus, the second cooling area is almost unusable for the cooling of food products.

U.S. Pat. No. 9,068,773 Pan Chiller System having Liquid Coolant in Direct Contact with Dividing Walls by Lintker et al. issued on Jun. 30, 2015 does apply coolant to walls that are in contact with a food cooling area. Unfortunately, the Lintker system is burdened with an awkward and inefficient configuration of hollow divider bars that add bulk, voids for condensation and obstacles to the flow of cooling fluids. Lintker's penchant for internal ribs and fins also adds inefficiencies in both cooling and maximizing cooling the size of cooling compartments.

With Respect to the Use of Gel Packs or Other Means of Thermal Storage and Heat Transfer:

U.S. Pat. No. 5,704,485 by Cautereels et al, issued on Jan. 6, 1998 discloses a cooling pack to help define cooling chambers. Cautereels does not leverage the cooling pack to accept heat transfer form cooling lines or provide heat transfer into cooling lines.

UK Patent Application GB 2514622 published on Mar. 12, 2014 by van Beek et al discloses a phase change material that may be water with the water acting as a thermal store that supplements cooling supplied by an evaporator. van Beek fails to consider, disclose or suggest the use of a thermal store integrated with cooling line or the use of gel packs.

U.S. Pat. No. 5,701,757 Portable Refrigerator Food Container by Heverly, granted on Dec. 30, 1997 uses pre-frozen gel packs sealed with inner and outer pans. While Heverly prevents the escape of cooled are between the pans, Heverly is a static system, not in thermal connection with a refrigeration line or other means of sustainable cooling.

U.S. Pat. No. 4,377,075 by Russo, issued Mar. 22, 1983 uses refrigerant gel to separate and protect a cooled product from direct contact with dry ice.

U.S. Pat. No. 7,021,079 by Contrino issued on Apr. 4, 2006 entitled Portable Hockey Puck Freezer discloses an interesting integration of freezable gel and cooling spaces used to keep hockey pucks frozen.

U.S. Published Patent Application 2007/0084232 published on Apr. 19, 2007 by Whewell teaches away from the use of gel packs in favor of using dried ice at para 0002.

With Respect to Buffering or Enclosing a Thermometer to Replicate Food Temperatures:

German patent application DE3032865A1 by Ober-Ulm Deubel published on Apr. 15, 1982 discloses a temperature probe disposed within a block of paraffin.

U.S. Pat. No. 3,606,792 issued on Sep. 21, 1971 to Yoshimoto discloses a thermometer disposed within a metal casing.

U.S. Pat. No. 3,690,175 issued on Sep. 12, 1972 by Butts discloses a thermometer sandwiched between two metal plates.

U.S. Pat. No. 6,976,368 issued on Dec. 20, 2005 to Lamstaes et al discloses an unduly complicated system encasing a thermometer in a food simulant and using various heat sinks to modify the thermal characteristics of the chamber holding the thermometer. Lamstaes is unduly burdensome in that constant adjustments or the changing of heat sinks presents unrealistic maintenance protocols.

BRIEF SUMMARY OF THE INVENTION

The disclosed embodiments overcome shortfalls in the related of art of saute stations and other refrigeration systems having refrigeration and gas burners by use of and unique configurations of pan chillers flanking burners with lower drawers for further cold storage of foodstuffs. New efficiencies in cooling are achieved, inter alia, by use of gel packs or other means of thermal storage disposed within a peripheral tank the with same peripheral tank containing coolant lines, and the thermal storage in direct thermal contact with the coolant lines.

The gel packs may act as a thermal store, achieving initial coldness by use of the integral refrigeration lines. The artful combination of the gel packs and refrigeration lines cools the pan chillers and lower storage areas with new efficiencies in cooling. Between uses of the condenser, the gel packs provide both active insulation and long-term passive cooling. The gel packs continue to remove heat between condenser cycles and moreover, when an interior section reaches an upper set point, the coolant in the lines remain pre-cooled by the gel packs, thus saving time in recooling the food storage areas as the condenser is activated.

The gel packs or thermal storage system remains in a slurry state well below 32 degrees Fahrenheit, thus not presenting an expansive force that may break the gel/coolant line tanks. Thus, the disclosed embodiments increase the life span of coolant tanks. This is an important feature as most coolant tanks are held together with TIG welds and are phone to failure. Unfortunately, hydro forming of coolant tanks is not yet economically feasible, which is why most coolant tanks are TIG welded. Ideally, to construct metal waterproof compartments, a process of hydro forming would be used, wherein a single piece of sheet metal is formed into the liner without welds. In the event that a TIG welded coolant tank comes apart at a seam or weld, the disclosed gel pack system remains operational as the fluid in the gel packs remains contained within the original plastic wrapping system.

The disclosed embodiments include particular compositions of fluid contained within the packs or flexible plastic sheets. In general, such compositions are referred to as "gel packs."

Further cooling efficiencies are achieved by preventing premature cycling of the condenser due to short introductions of ambient air that are common when a door is opened to a refrigerated area. The problem to be solved is that traditional thermometers or heat sensors react relatively quickly to the introduction of ambient air, even though the stored food stuffs (having greater thermal density than the ambient air) are much slower to change temperature. Thus, to overcome the prior art's shortfall of premature condenser activation, buffered food sensors or enclosed thermometers are used in food storage areas. The disclosed buffered or enclosed thermometers are thermally efficient and cost effective. The prior art fails to effectively address the long-standing ambient air issue as very few if any current commercial pan chillers use a buffered thermometer or otherwise even try to replicate or predict food temperatures.

While the general idea of buffered thermometers or food simulants is known in the prior art, the disclosed embodiments overcome the short falls in the art by using a unique and unobvious mixture and viscosity of materials to accurately and economically mimic the thermal properties of food in a manner that is well suited for encapsulating a thermometer. The disclosed materials are sometimes referred to as a food simulant.

Figure 1:
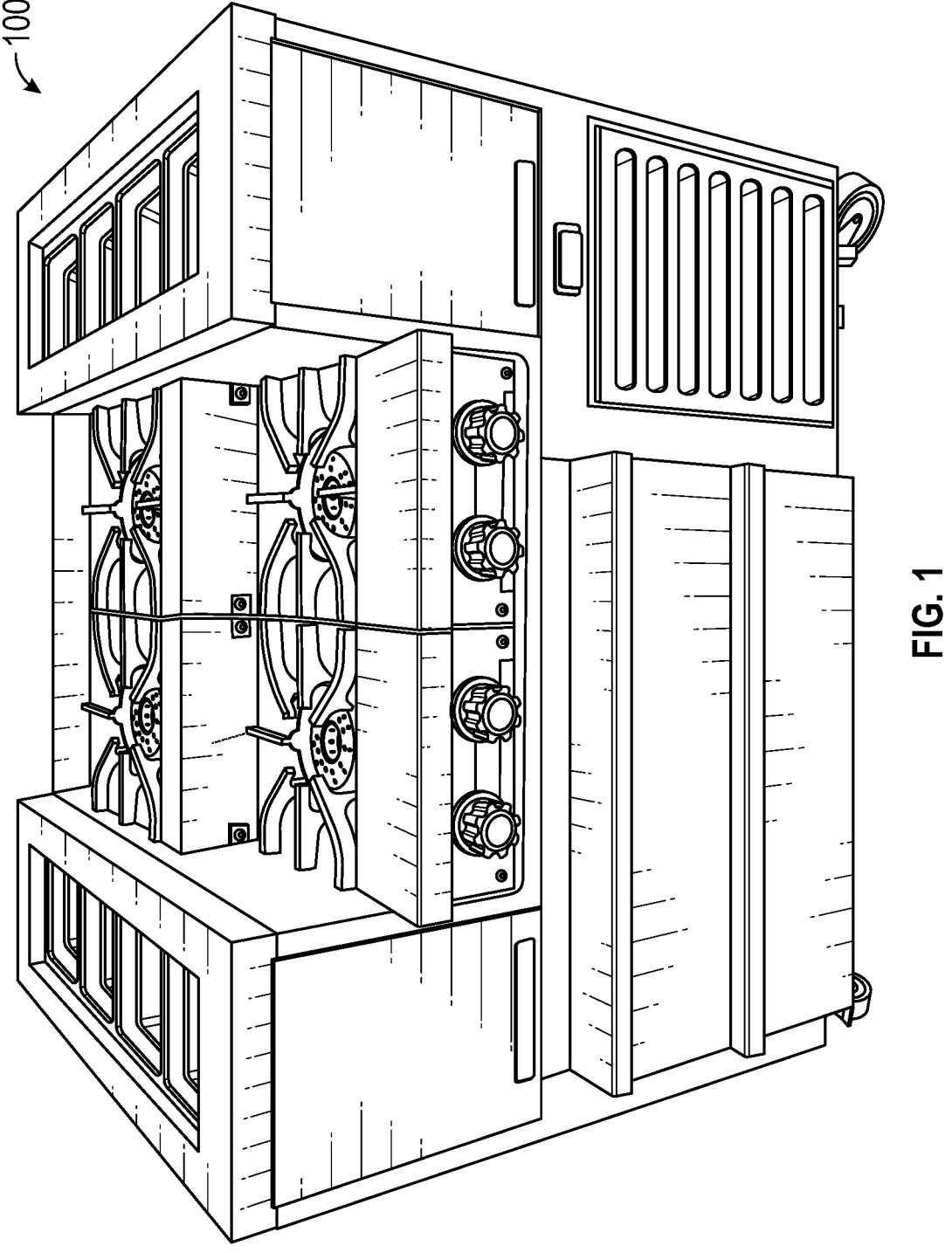
FIG. 1 front perspective view of a disclosed dual temperature saute station

REFERENCE NUMERALS IN THE DRAWINGS 100 dual temperature saute station
200 cooling components
202 pan chiller end
203 pan divider
204 drain pipe
205 sensing probe housing
206 refrigerant line
207 lip of pan chiller pan 225
220 drain void defined within lower plate 230 pan chiller pan 225
225 pan chiller pan
227 cooling void defined within the pan chiller pan
240 side wall of pan chiller pan 225
260 gel pack and coolant line housing may be permanently sealed
265 outer wall of gel pack and coolant line housing
270 gel pack and coolant line void, defined by outer wall 265 and inner wall 275.
275 inner wall of gel pack and coolant line housing 260
280 form assembly
285 outer wall of form assembly 280
290 inner wall of form assembly 280
295 inner void of middle area of form assembly, defined between outer wall 285 and inner wall 290 foam is injected into the void. The top of the liners may be solid and fill voids may be used to inject foam or other insulating material.
300 temperature probe assembly
301 outer sleeve
302 temperature probe
303 end cap
304 retainer bushing may be tig welded in place
320 temperature sensor wire senses ohms to derive temperature
350 void for food simulant or other buffer material, the void defined by the outside diameter of the temperature probe 302 and inside diameter of the outer sleeve 301

These and other aspects of the present invention will become apparent upon reading the following detailed description in conjunction with the associated drawings.

DETAILED DESCRIPTION OF EMBODIMENTS OF THE INVENTION

The following detailed description is directed to certain specific embodiments of the invention. However, the invention can be embodied in a multitude of different ways as defined and covered by the claims and their equivalents. In this description, reference is made to the drawings wherein like parts are designated with like numerals throughout.

Unless otherwise noted in this specification or in the claims, all of the terms used in the specification and the claims will have the meanings normally ascribed to these terms by workers in the art.

Unless the context clearly requires otherwise, throughout the description and the claims, the words "comprise," "comprising" and the like are to be construed in an inclusive sense as opposed to an exclusive or exhaustive sense; that is to say, in a sense of "including, but not limited to." Words using the singular or plural number also include the plural or singular number, respectively. Additionally, the words "herein," "above," "below," and words of similar import, when used in this application, shall refer to this application as a whole and not to any particular portions of this application.

Referring to FIG. 1, a dual temperature saute station may include a Carel dual temperature controller wherein each controller may individually operate one pan chiller. Two or more separate temperature settings are available for each pan chiller and controller. An under-counter unit may include gel pack systems wherein a bottom coil uses thermal energy from a thermal storage system such as gel packs. Disclosed embodiments may use standardized cooling mechanisms such as an R-448A Commercial Temperature Evaporative Condensing Unit.

FIG. 1 shows two pan chiller systems on either side of a gas burner system. Disclosed embodiments are sometimes referred to as Dual Temperature Saute Stations and are well suited for frying eggs or pancakes or heating other food by use of the burners and for keeping fresh food chilled and readily available within one or more pan chiller units.

Figure 2:
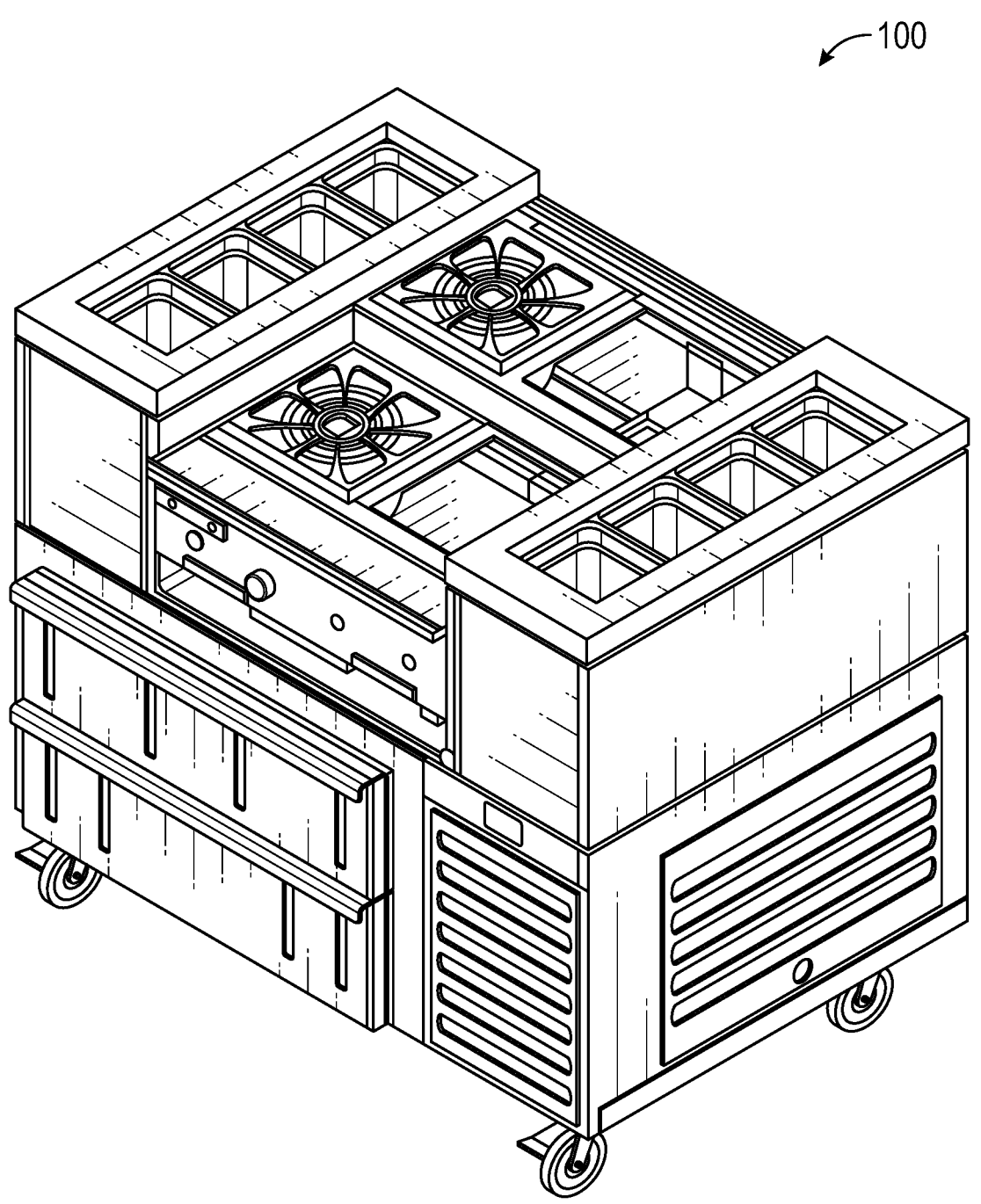
FIG. 2 side and top perspective view of a disclosed dual temperature saute station FIG. 3 top view of a disclosed dual temperature saute station FIG. 4 right side view of a disclosed dual temperature saute station FIG. 5 front view of a disclosed dual temperature saute station FIG. 6 exploded view of coolant related components FIG. 7 front view of tank and coolant components FIG. 8 sectional view of coolant components FIG. 9 exploded view of temperature sensing components FIG. 10 sectional view of temperature sensing components FIG. 11 perspective view of a buffered temperature sensor attached to a power and reporting cord

FIG. 2 demonstrates the versatility and modularity of the disclosed embodiments as there are just two burners on the left center area and refrigeration available on the right center area.

Disclosed embodiments are versatile and may be exceptional portable as often required for hotels, resorts or events. Embodiments may include propane gas tanks and electrical cords.

Figure 6:
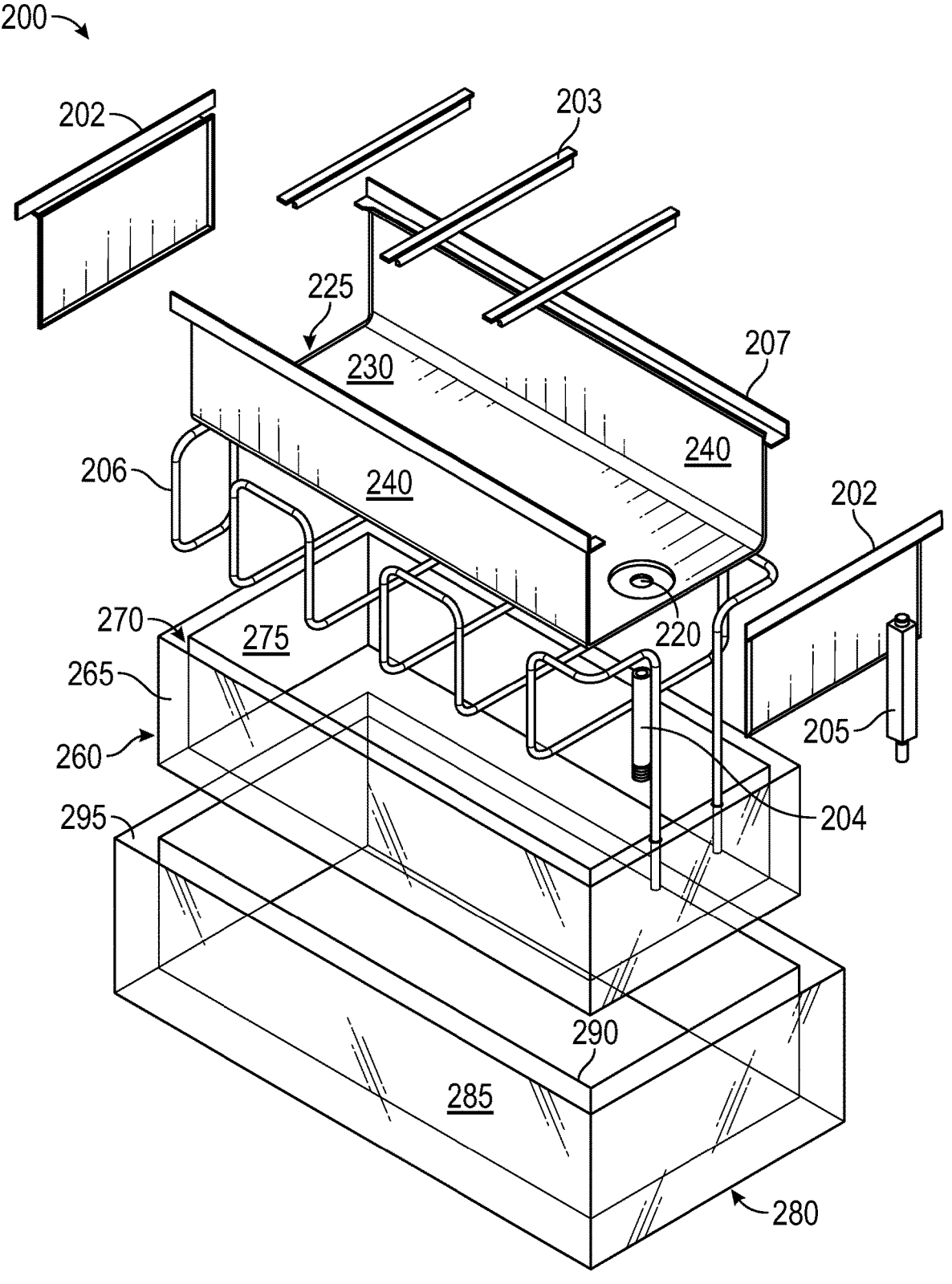

FIG. 6 presents an exploded view of cooling components 200 that may include a form 280 that may support, contain or insulate a gel pack and coolant line housing 260. The housing 260 may comprise an outer shell 265 or outer wall and an inner shell 275 or inner wall. The inner and outer walls may define a gel pack and coolant line void which may hold gel packs and coolant lines in direct thermal contact.

Figure 3:
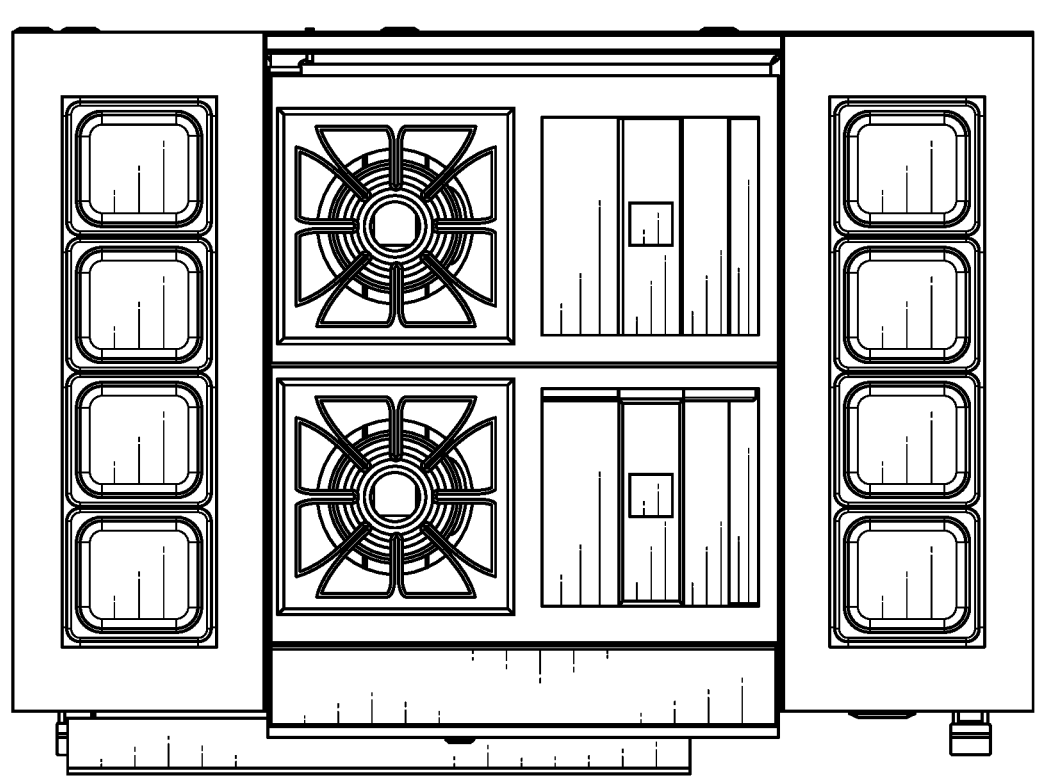
Figures 4, 5:
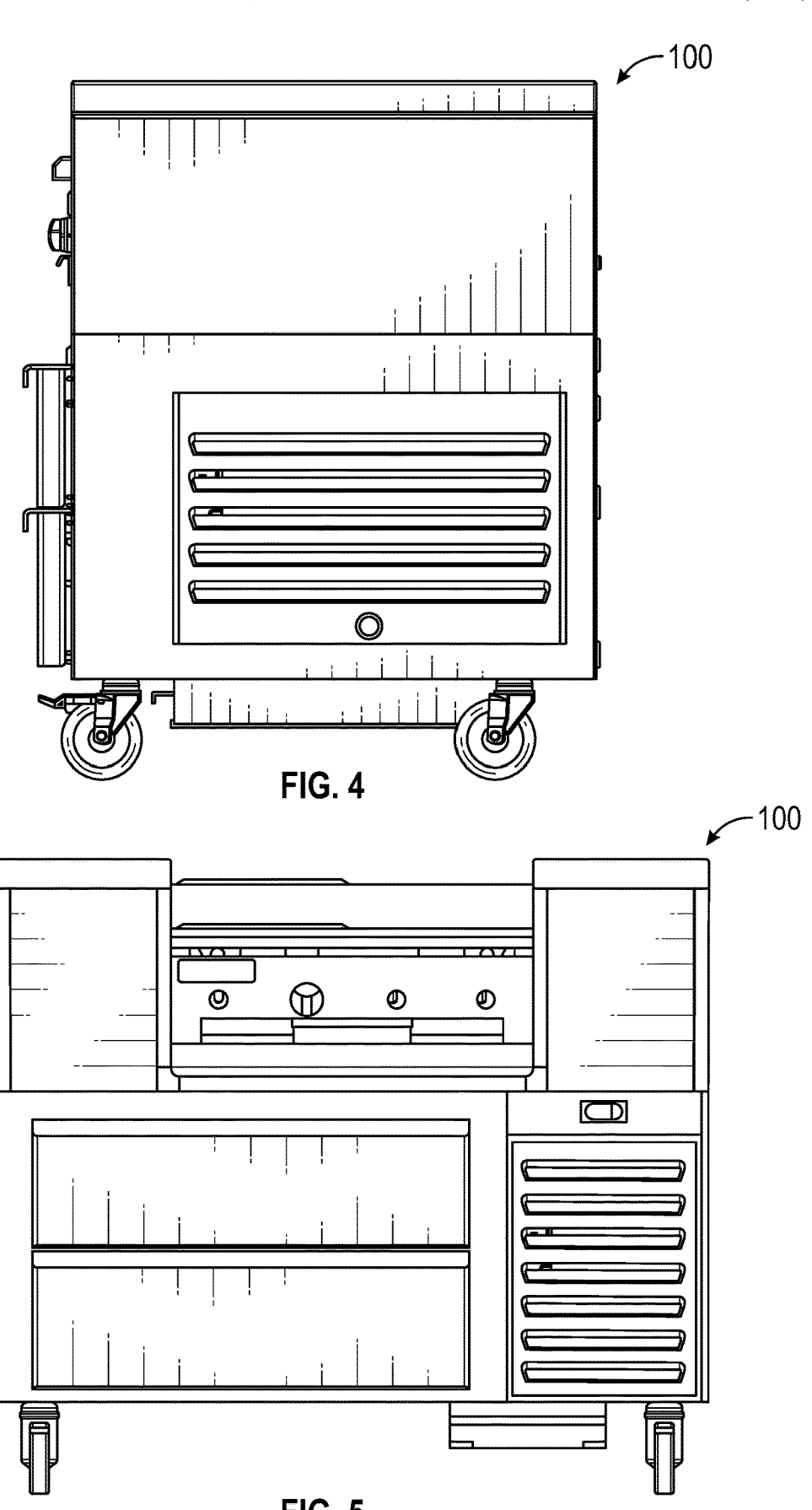

The inside surfaces of the inner wall 275 may define a void to accept a pan chiller pan 225. The pan chiller pan may be divided into framed areas and accept pans as shown in FIG. 3.

The gel packs avoid drainage and welding problems presented by using glycol or other free flowing coolants. The disclosed gel packs have been found to stay frozen for up to 48 hours and are easily removable and replaced, to aid in the portability features as discussed above. Gel packs are reusable and robust. Gel packs may contain a food grade glycerin which may be NSF or National Safety Food standard. The glycerin may freeze to negative 60 degrees before freezing solid. The advantage of such freezing points is that the glycerin remains fluid or slushy during normal use.

The fluid used within the plastic voids overcomes shortfalls in the related art buy having a lower freezing point compared to prior art products. In one disclosed embodiment, the fluid contained within a flexible membrane may include a mixture of 50 to 90 percent USP grade vegetable glycerin and 10 to 50 percent USP grade propylene glycol. The viscosity of the disclosed gel is in the range of 1,000 to 3,000 centipoises at 20 degrees centigrade. USP or USP— NF may stand for United States Pharmacopeia—National Formulary.

Figure 7:
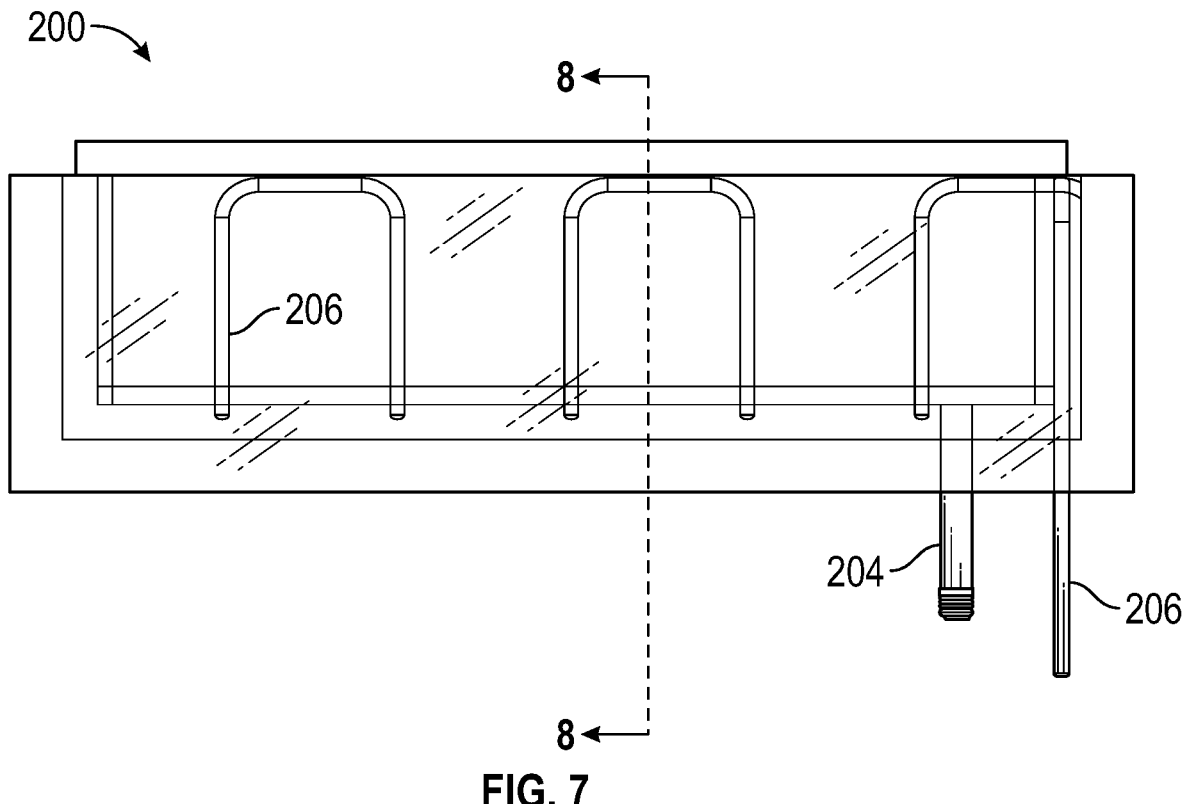
Figure 8:
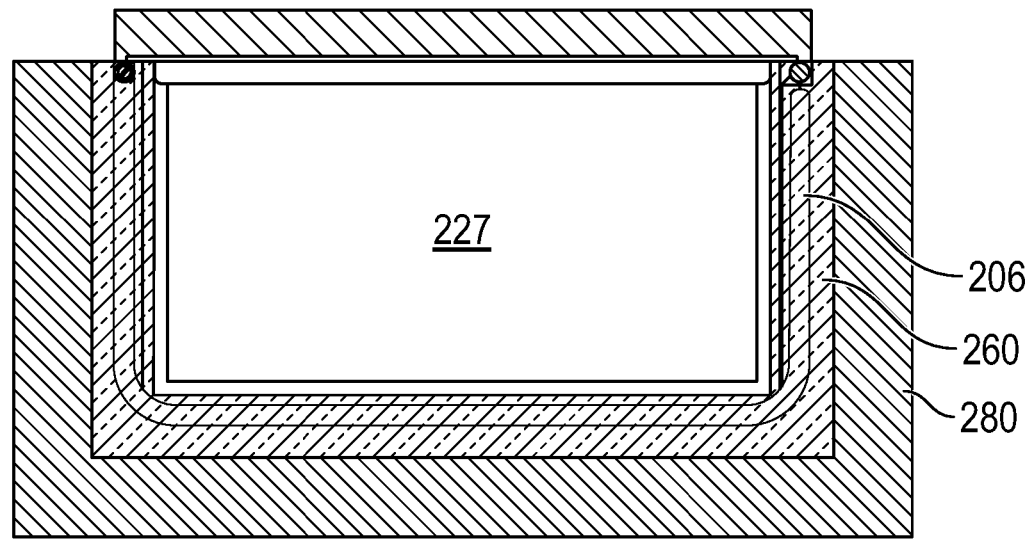

FIG. 7 and FIG. 8 depict the disclosed layers of components that define a center cooling void 227 defined by the pan chiller pan.

Figures 9, 10:
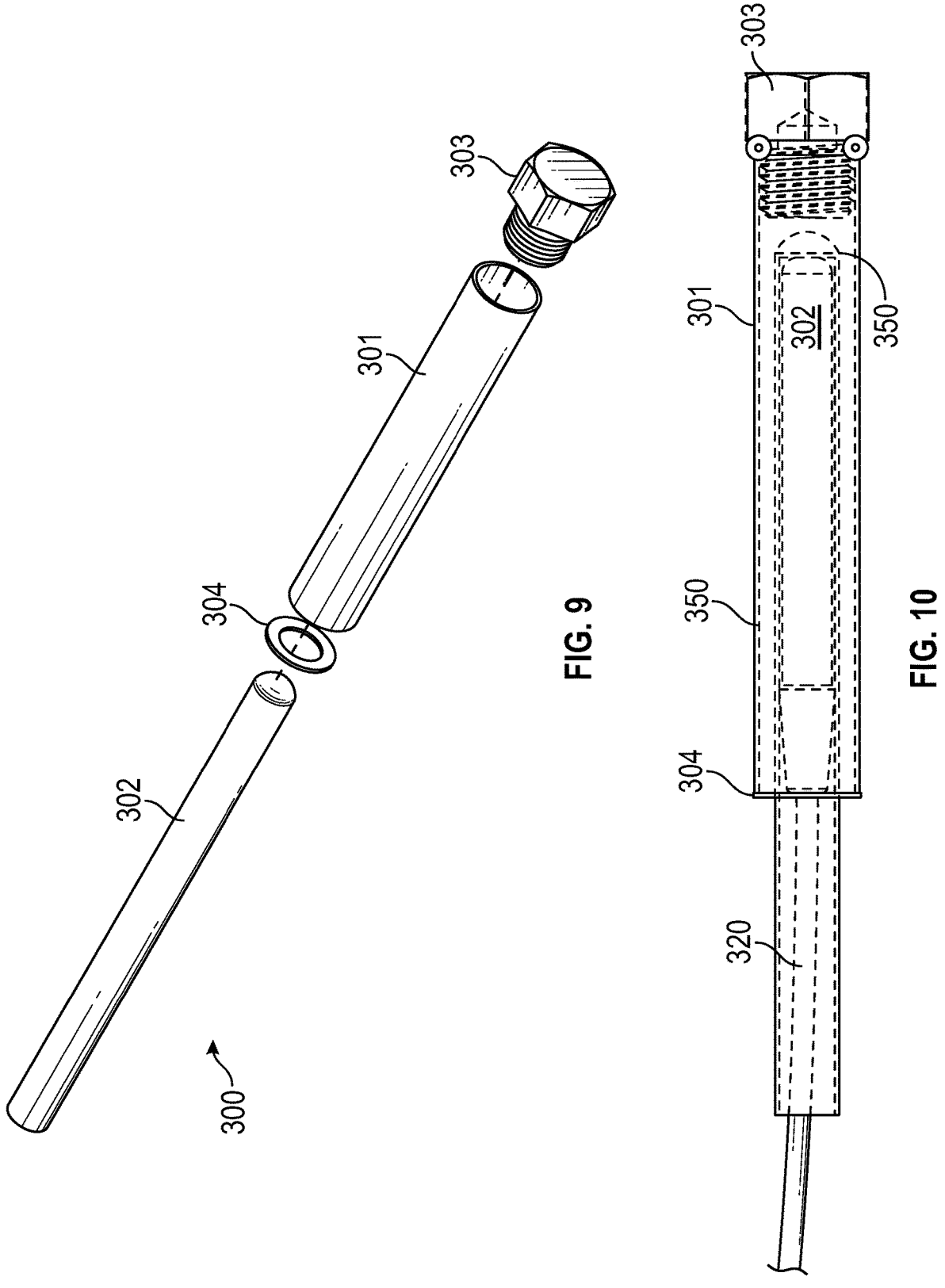
Figure 11:
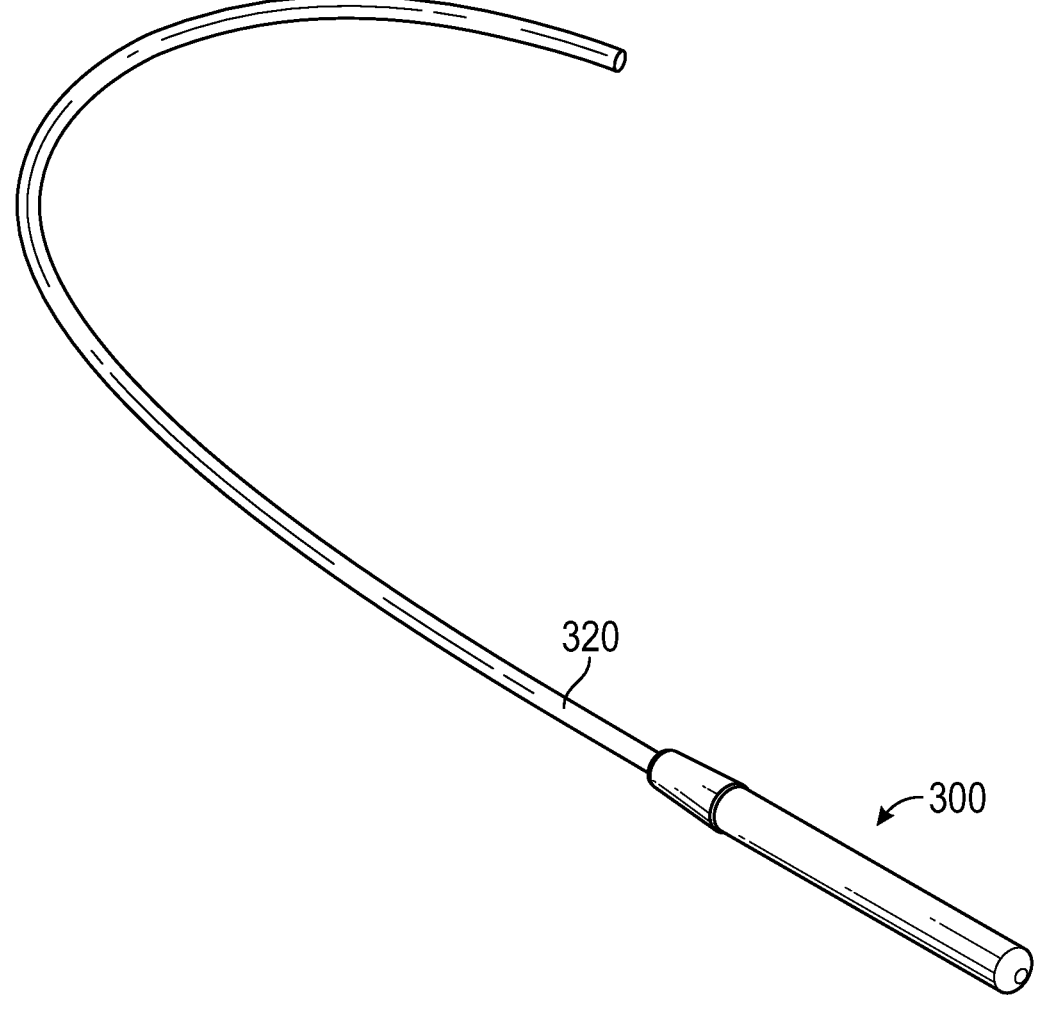

FIG. 9 and FIG. 10 depict a buffered temperature probe system 300 that may comprise a temperature probe 302 having a smaller outer diameter as compared to the inside diameter of an outer sleeve 301. The temperature probe may be secured within the outer sleeve by use of an endcap 303 and retainer bushing 304. A food simulant or other buffer material may be disposed within a void 350 for food simulant or other buffer material, the void defined by the outside diameter of the temperature probe 302 and inside diameter of the outer sleeve 301.

The food simulant or other buffer material used in the disclosed embodiments has achieved unexpectedly excellent results as compared to the materials used in the prior art. This is evident by, inter alia, the fact that buffered or encased thermometers are generally found in the prior art literature only and not in current use. Thus, there is a need in the art for the disclosed food simulate formulations.

Disclosed food simulant formulations may include may include a mixture of 60 to 80 percent USP grade vegetable glycerin and 20 to 40 percent USP grade propylene glycol. An optimized range may include a mixture of 65 to 75 percent USP grade vegetable glycerin and 25 to 35 percent USP grade propylene glycol.

Disclosed methods of construction or assembly may include using a retaining bushing 304 the temperature sensor 302 into the sleeve 301 and then overfilling the sleeve with a disclosed food simulant mixture. Due to the viscosity of the food simulant mixture a syringe may be needed for injection into the sleeve. The end cap 303 may then be screwed into the sleeve causing the food simulant to overflow and to prevent air bubbles in the sleeve.

Disclosed embodiments may include the use of foam or other insulation within form assembly 280.

Disclosed embodiments may include disposing coolant lines and gel packs within the gel pack and cooling line housing and sealing the top part of the gel pack void 270 with metal and TIG welds.

The above detailed description of embodiments of the invention is not intended to be exhaustive or to limit the invention to the precise form disclosed above. While specific embodiments of, and examples for, the invention are described above for illustrative purposes, various equivalent modifications are possible within the scope of the invention, as those skilled in the relevant art will recognize. For example, while steps are presented in a given order, alternative embodiments may perform routines having steps in a different order. The teachings of the invention provided herein can be applied to other systems, not only the systems described herein. The various embodiments described herein can be combined to provide further embodiments. These and other changes can be made to the invention in light of the detailed description.

All the above references and U.S. patents and applications are incorporated herein by reference. Aspects of the invention can be modified, if necessary, to employ the systems, functions and concepts of the various patents and applications described above to provide yet further embodiments of the invention.

These and other changes can be made to the invention in light of the above detailed description. In general, the terms used in the following claims, should not be construed to limit the invention to the specific embodiments disclosed in the specification, unless the above detailed description explicitly defines such terms. Accordingly, the actual scope of the invention encompasses the disclosed embodiments and all equivalent ways of practicing or implementing the invention under the claims.

While certain aspects of the invention are presented below in certain claim forms, the inventors contemplate the various aspects of the invention in any number of claim forms.

What is claimed is:

1. A buffered temperature sensing system, the system comprising:

a) a temperature probe having a smaller outside diameter as compared to an inside diameter of an outer sleeve;

b) the temperature probe disposed within the outer sleeve; and c) the area between the temperature probe and the inside of the outer sleeve filled with a food simulant, the food simulant comprising 60 to 80 percent vegetable glycerin and 20 to 40 percent propylene glycol.

2. The system of claim 1, wherein the food simulant compromises 65 to 75 percent vegetable glycerin and 25 to 35 percent propylene glycol.

3. The system of claim 1, wherein an endcap is disposed on a distal end of the sleeve.

4. The system of claim 1, wherein the outer sleeve comprises a proximal end attached to a bushing.

5. The system of claim 1, wherein the temperature probe is disposed within a food storage area within a housing, the housing defining a void which includes refrigerant lines and gel packs.

6. The system of claim 5, wherein the gel packs comprise fluid contained within a flexible membrane, the fluid comprising 50 to 90 percent vegetable glycerin and 10 to 50 percent propylene glycol.

7. The system of claim 6, wherein the gel pack and coolant line housing is contained within a form assembly (280) and the form assembly is insulated with foam insulation.

8. The system of claim 7, wherein the food storage area comprises a pan chiller pan (230) and the pan chiller pan comprises sidewalls (240) with the sidewalls having upper portions comprising a first and second lip (207) with the first and second lips supporting a plurality of pan dividers (203).

9. A food cooling system comprising a food storage area with the food storage area disposed within a housing, the housing defining a void containing refrigerant lines and gel packs, wherein the gel packs comprise fluid contained within a flexible membrane, the fluid comprising 50 to 90 percent vegetable glycerin and 10 to 50 percent propylene glycol.

10. The food cooling system of claim 9, wherein the system is disposed within a form assembly is insulated with foam insulation.

\* \* \* \* \*